United States Patent
Beek et al.

(10) Patent No.: US 9,688,783 B2
(45) Date of Patent: Jun. 27, 2017

(54) PROCESS FOR MODIFYING ETHYLENE-BASED POLYMERS AND COPOLYMERS

(71) Applicant: Akzo Nobel Chemicals International B.V., Arnhem (NL)

(72) Inventors: Waldo Joseph Elisabeth Beek, Deventer (NL); Auke Gerardus Talma, Bathmen (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/034,720

(22) PCT Filed: Oct. 31, 2014

(86) PCT No.: PCT/EP2014/073418
§ 371 (c)(1),
(2) Date: May 5, 2016

(87) PCT Pub. No.: WO2015/067533
PCT Pub. Date: May 14, 2015

(65) Prior Publication Data
US 2016/0347876 A1    Dec. 1, 2016

(30) Foreign Application Priority Data
Nov. 7, 2013   (EP) .................................. 13191976

(51) Int. Cl.
| | |
|---|---|
| *C08F 8/30* | (2006.01) |
| *C08K 5/15* | (2006.01) |
| *H01B 3/44* | (2006.01) |
| *C08L 23/16* | (2006.01) |
| *C08F 8/34* | (2006.01) |
| *C08J 3/24* | (2006.01) |
| *C08K 5/14* | (2006.01) |
| *H01B 7/02* | (2006.01) |
| *H01B 13/00* | (2006.01) |

(52) U.S. Cl.
CPC ................. *C08F 8/30* (2013.01); *C08F 8/34* (2013.01); *C08J 3/247* (2013.01); *C08K 5/14* (2013.01); *C08K 5/15* (2013.01); *C08L 23/16* (2013.01); *H01B 3/441* (2013.01); *H01B 7/0208* (2013.01); *H01B 13/0036* (2013.01); *C08J 2323/36* (2013.01)

(58) Field of Classification Search
CPC combination set(s) only.
See application file for complete search history.

(56) References Cited

U.S. PATENT DOCUMENTS

| | | |
|---|---|---|
| 3,205,206 A | 9/1965 | Marcantonio et al. |
| 3,631,182 A * | 12/1971 | Breslow ................ C07C 247/00 525/333.7 |
| 4,287,294 A | 9/1981 | Rubner et al. |
| 4,329,556 A | 5/1982 | Rubner et al. |
| 4,352,938 A | 10/1982 | Breslow |
| 5,883,145 A | 3/1999 | Hurley et al. |
| 6,313,314 B1 * | 11/2001 | Cheng ................ C07D 207/452 548/549 |
| 2016/0264688 A1 | 9/2016 | Beek et al. |

(Continued)

FOREIGN PATENT DOCUMENTS

| | | |
|---|---|---|
| EP | 0019122 A2 | 11/1980 |
| EP | 0019726 A1 | 12/1980 |
| EP | 0143380 A2 | 6/1985 |

(Continued)

OTHER PUBLICATIONS

Stuart A. Bateman, et al., "Sulfonyl Azides—An Alternative Route to Polyolefin Modification," Journal of Applied Polymer Science, vol. 84, (2002), pp. 1395-1402.
A.J. Zielinska, Cross-Linking and Modification of Saturated Elastomers Using Functionalized Azides, Dissertation, University of Twente, Jul. 1, 2011 (1 of 2, cover page To p. 78).
A.J. Zielinska, Cross-Linking and Modification of Saturated Elastomers Using Functionalized Azides, Dissertation, University of Twente, Jul. 1, 2011 (2 of 2, pp. 79-165).

(Continued)

*Primary Examiner* — Timothy Thompson
*Assistant Examiner* — Krystal Robinson
(74) *Attorney, Agent, or Firm* — Alice C. Su

(57) ABSTRACT

Process for functionalizing an ethylene-based (co)polymer comprising the step of contacting an ethylene-based (co) polymer at a temperature in the range 100-250° C. with an azide of formula (I) wherein Y is either (Ia) or (Ib) m is 0 or 1, n is 0 or 1, n+m=1 or 2, and X is a linear or branched, aliphatic or aromatic hydrocarbon moiety with 1-12 carbon atoms, optionally containing heteroatoms.

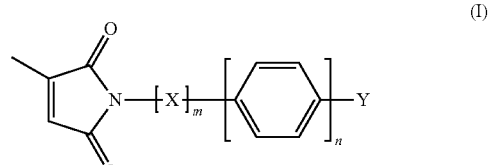

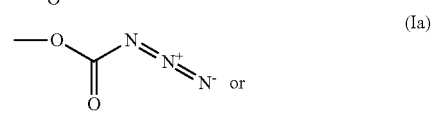

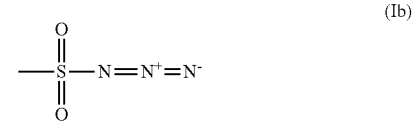

15 Claims, No Drawings

(56) References Cited

U.S. PATENT DOCUMENTS

2016/0280805 A1    9/2016  Beek et al.

FOREIGN PATENT DOCUMENTS

| | | |
|---|---|---|
| JP | 4372662 B2 | 11/2009 |
| WO | 2012/116250 A1 | 8/2012 |

OTHER PUBLICATIONS

Anon, Research Disclosure (1999), 427 (Nov.), p. 1472 (No. 427060).

J.E. Mark et al., The Science and Technology of Rubber, Third Edition, 2005, pp. 388-391.

Elisa Passaglia et al., "Effect of Structure of Functionalizing Molecules on the Inter-Macromolecular Reactions and Blending of Poly(ethylene-co-propylene) (EPM) With Poly (6-aminohexanoic Acid) (PA6)", Helvetica Chimica ACTA, vol. 89, No. 8, Aug. 30, 2006, pp. 1596-1609.

J.K. Jorgensen et al., "Introduction of Long-Chain Branches in Linear Polyethylene by Light Crosslinking with 1,3-Benzenedisulfonyl Azide," Polymer, 46, (2005), pp. 12256-12266.

Search Report of EP 13191967.3 dated Feb. 24, 2014.

International Search Report and Written Opinion of PCT/EP2014/073418, mailed Jan. 13, 2015.

Yang et al., "Thermal and mechanical properties of chemical crosslinked polylactide (PLA)," Polymer Testing, vol. 27, pp. 957-963, published Dec. 2008.

\* cited by examiner

PROCESS FOR MODIFYING ETHYLENE-BASED POLYMERS AND COPOLYMERS

This application is a national stage filing under 35 U.S.C. §371 of PCT/EP2014/073418, filed Oct. 31, 2014, which claims priority European Patent Application No. 13191976.3, filed Nov. 7, 2013, the contents of which are each incorporated herein by reference in their entireties.

The present invention relates to processes for functionalising and modifying ethylene-based (co)polymers, functionalised and modified ethylene-based (co)polymers obtainable by these processes, and their use of the production of power cables.

Typical cable and cable-in-wire applications comprise at least one conductor surrounded by one or more layers of polymeric material.

In some power cables, including medium voltage (MV), high voltage (HV) and extra high voltage (EHV) cables, the conductor is surrounded by several layers, including an inner semiconductive layer, an insulation layer and an outer semiconductive layer. The outer semiconductive layer of the power cable can be non-strippable (i.e. bonded and non-peelable) or strippable (i.e. non-bonded and peelable). The conductor can be surrounded by an inner semiconductive layer which generally comprises crosslinked ethylene-based copolymer filled with conductive carbon black. The insulation layer is generally made of low density polyethylene (LDPE) that is crosslinked to give it desirable long term properties. The outer semiconductive layer is again a cross-linked semiconductive ethylene-based copolymer layer and this is often reinforced by metal wiring or covered by a sheet (metallic screening material).

Power cables are commonly produced by extruding the layers on a conductor. One or more of said polyethylene or ethylene-based copolymer layers are then crosslinked to improve its/their deformation resistance at elevated temperatures, mechanical strength and/or chemical resistance. A free radical initiator, such as a peroxide, is typically incorporated in the layer material prior to or during extrusion of the layer(s). After extrusion and formation of the cable, the cable is subjected to a crosslinking step, initiated by the free radical initiator.

In the conventional way of free radical ethylene-based (co)polymer crosslinking, residual volatiles stemming from peroxide decomposition products, such as methane, remain in the cable as voids or are released as highly flammable gaseous substances. An object of the present invention is to provide a process for crosslinking polyethylene which allows the use of lower amounts of peroxide, resulting in lower amounts of volatiles, with still good crosslinking performance.

It has now been found that if an ethylene-based (co)polymer is first functionalized with a citraconimide-type azide, the free radical crosslinking occurs faster and more efficient, meaning that it requires lower amounts of peroxide.

Furthermore, it has been found that the said functionalisation with a citraconimide-type azide can affect the polarity of the (co)polymer, resulting in, for instance, a better compatibility with paint layers.

In addition, said functionalisation can be used to increase the number of long chain branches, thereby changing the rheology of the (co)polymer, resulting in an enhanced melt strength.

The present invention therefore relates to a process for preparing a functionalised ethylene-based (co)polymer comprising the step of contacting an ethylene-based (co)polymer at a temperature in the range 100-250° C. with an azide of formula (I)

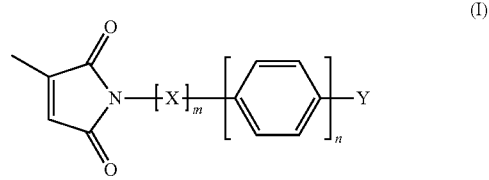

wherein Y is either

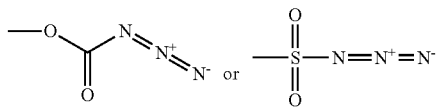

m is 0 or 1, n is 0 or 1, n+m=1 or 2, and X is a linear or branched, aliphatic or aromatic hydrocarbon moiety with 1-12 carbon atoms, optionally containing heteroatoms.

The invention also relates to a process for modifying an ethylene-based (co)polymer comprising the steps of:
preparing a functionalised ethylene-based (co)polymer according to the process described above,
contacting the functionalised ethylene-based (co)polymer with an organic peroxide to form a polymer/peroxide mixture, and
heating said polymer/peroxide mixture at a temperature in the range 140-300° C.

This process results in a modification of the rheology of the (co)polymer. Depending on the exact conditions, the result is either a crosslinked (co)polymer or a (co)polymer with increased melt strength. Crosslinking will be achieved by high peroxide levels and increased melt strength will be achieved at low peroxide levels.

The precise levels depend on the type of (co)polymer, the type of peroxide, and the level of functionalisation of the (co)polymer The term ethylene-based (co)polymer includes both ethylene homopolymers and copolymers based on ethylene and one or more additional monomers.

Examples of ethylene-based copolymers are ethylene-propylene based copolymers (EPM), ethylene-propylene-diene terpolymer (EPDM), ethylene vinylacetate (EVA, ethylene butyl acrylate (EBA), ethylene ethyl acrylate (EEA), and polyolefin elastomers (POE); the latter being copolymers of ethylene with octene or butene.

Ethylene homopolymers, i.e. polyethylenes, are generally classified according to their density. High density polyethylene (HDPE) is defined by a density of greater that or equal to 0.941 g/cm$^3$; medium density polyethylene (MDPE) is defined by a density range of 0.926-0.940 g/cm$^3$; low linear density polyethylene (LLDPE) is defined by a density range of 0.915-0.925 g/cm$^3$; low density polyethylene (LDPE) is defined by a density range of 0.910-0.940 g/cm$^3$; very low density polyethylene (VLDPE) is defined by a density range of 0.880-0.915 g/cm$^3$.

All these ethylene homopolymers can be used in the process of the present invention. LDPE is, however, the most preferred type to be used. LDPE is the preferred ethylene-based (co)polymer because of its flexibility and good mechanical strength.

The azide to be used in the process of the present invention has the formula:

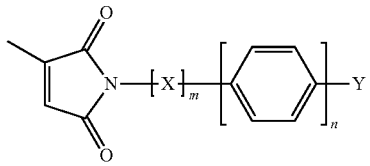

wherein Y is either

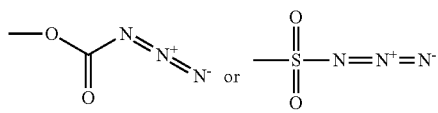

m is 0 or 1, n is 0 or 1, n+m=1 or 2, preferably 1, and
X is a linear or branched, aliphatic or aromatic hydrocarbon moiety with 1-12 carbon atoms, optionally containing heteroatoms.

The citraconazide of formula (I) can be used in pure form, but also in admixture with the corresponding itaconazide.

When X contains heteroatoms, it preferably has one of the following structures:

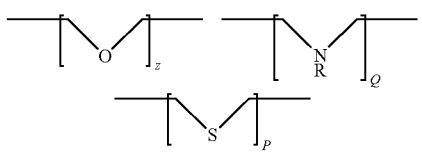

wherein Z, Q and P are integers ranging from 1 to 6 and R is selected from the group consisting of H, alkyl, aryl, phenyl, and substituted phenyl groups.

More preferably, however, X is an aliphatic alkanediyl group with 1-12, more preferably 1-6, and most preferably 2-4 carbon atoms.

The most preferred azide for use in the process according to the present invention is

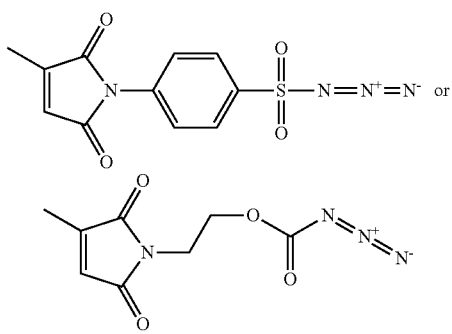

i.e. 4-(3-methyl-2,5-dioxo-2,5-dihydro-1H-pyrrol-1-yl)benzenesulfonyl azide (also called citraconimide benzenesulfonylazide) and 2-(3-methyl-2,5-dioxo-2,5-dihydro-1H-pyrrol-1-yl)ethyl carbonazidate (also called citraconimide-C2-azidoformate), respectively.

There are several mechanisms of reacting an azide with a polymer, depending on the type of azide and the type of polymer. Azides generally decompose thermally into two types of nitrenes: singlet (majority) and triplet (minority). A reaction of the singlet state of the nitrene with a fully saturated polymer chain results in insertion of the azide into the polymer chain. Reaction of singlet and triplet nitrene with unsaturations results in addition reactions onto carbon-carbon double bonds which also leads to grafting. Polyethylene is a saturated polymer with only few unsaturations, which stem from imperfections during polymerization. In EPDM the unsaturations are deliberately built-in into the polymer backbone by the use of a third monomer.

Reaction with unsaturated polymers can also be done by grafting at fairly low temperature in a "click" reaction, followed by a heating step during which nitrogen is removed.

The ethylene-based (co)polymer and the azide are contacted at a temperature ranging from 100 to 250° C., preferably 140-230° C., and most preferably 150-220° C. Contacting can be performed in different ways, including melt-blending, mixing in two roll mills, extrusion, mixing from a common solvent, etc. It is also possible to mix the azide into a compounded ethylene-based (co)polymer, i.e. an ethylene-based (co)polymer already blended with oils, fillers, and other optional additives such as anti-degradants, colorants, etc.

The azide is mixed with the ethylene-based (co)polymer in a preferred amount of 0.1-5 phr (weight parts per hundred weight parts (co)polymer), more preferably 0.2-4 phr, and most preferably 0.3-3 phr.

In the process for crosslinking the ethylene-based (co)polymer, the initial contacting of the functionalised ethylene-based (co)polymer with the organic peroxide is to be performed below the safe processing temperature of the peroxide. The safe processing temperature of a peroxide is the temperature at which the scorch time ($t_{s2}$) is longer than 20 minutes. The scorch time is measured according to ISO 6502:1991 in a rheometer using a moving die.

Safe processing temperatures measured in this way can also be found in the AkzoNobel brochure "Crosslinking elastomers and thermoplastics (2011)".

Suitable organic peroxides include dialkyl peroxides and trioxepanes. Specifically preferred peroxides are 3,3,5,7,7-pentamethyl-1,2,4 trioxepane (safe processing temperature: 180° C.), 2,5-dimethyl-2,5-di(tertbutylperoxy)hexyne-3 (safe processing temperature: 145° C.), 2,5-dimethyl-2,5-di(tertbutylperoxy)hexane (safe processing temperature: 135° C.), di(tert-butylperoxyisopropyl)benzene (safe processing temperature: 135° C.), dicumyl peroxide (safe processing temperature: 170° C.), and tert-butyl cumyl peroxide (safe processing temperature: 135° C.).

The peroxide can be added in liquid or molten form to beads or granules of the functionalised ethylene-based (co)polymer and allowed to diffuse into said beads or granules. This is preferably done at a temperature below 80° C., more preferably below 60° C., and most preferably in the range 20-40° C.

Alternatively, the peroxide and the functionalised ethylene-based (co)polymer are extruded or melt mixed below the safe processing temperature of the peroxide. Another method involves mixing the peroxide and the grafted ethylene-based (co)polymer on a two roll mill.

The organic peroxide is used in the process of the present invention in a preferred amount of 0.1-5 wt %, more preferably 0.2-4 wt %, and most preferably 0.3-3 wt %, based on the total weight of the peroxide-containing mixture, including peroxide, functionalised ethylene-based (co) polymer, fillers, and additives.

Additional components can be added at this stage, such as anti-oxidants, flame retardants, scorch retarding agents, co-agents, anti-static agents, pigments, colorants, water tree retarding agents, lubricants, and/or slip agents. In case of polyethylene, all of these additives are generally used in relatively small amounts, usually less than 3 wt % with respect to the total mixture.

Examples of a water tree retarding agent are polyethylene glycols (PEG), for instance PEG-2000; a polyethylene glycol with a molecular weight of 2000 Da.

Examples of scorch retarding agents are tert-butylhydroquinone and alfa-methylstyrene dimer (4,4-Dimethyl-2,4-diphenyl-1-butene).

Examples of coagents are: TMAIC (trimethallyl isocyanurate), TAIC (triallyl isocyanurate), TAC (triallycyanurate), TRIM (trimethylol propane trimethacrylate), divinylbenzene, HVA-2 (N,N'-phenylene bismaleimide), and Perkalink 900 (1,3-bis(citraconimidomethyl)benzene).

Other additives, which may be used in higher amounts, are reinforcing fillers like carbon black and silica (particular for ethylene-based copolymers) or non-reinforcing mineral fillers. The latter can be added in amounts up to 60 wt %. Electron conductive carbon black can be added in amounts up to 8 wt %.

After contacting the peroxide with the functionalised ethylene-based (co)polymer and prior to any further thermal treatment, the peroxide/(co)polymer mixture can be shaped in a desired form. For shaping, heat is required to melt or soften the ethylene-based (co)polymer. This shaping can be performed in a mould (compression, injection or transfer moulding); an extruder, (where shaping dies can be installed at the extruder head); or a calender (to process a polymer melt into a sheet or thin film), or by film blowing or thermoforming.

Any method can be used to heat the mixture to the required temperature. Examples are: heating in the mould (compression, injection or transfer moulding); heating in (saturated steam, or nitrogen filled) tubular ovens, heating in salt baths, and heating in hot air using ovens or infrared irradiation.

The temperature is preferably in the range 140 to 300° C., preferably 150 to 250° C., and most preferably 160 to 230° C.

In one preferred embodiment, the process according to the invention is applied in the production of a cable comprising an electrical conductor (i.e. one or more wires) surrounded by one or more layers, wherein at least one layer comprises the crosslinked ethylene-based (co)polymer. Preferably, the crosslinked ethylene-based (co)polymer is part of the insulation layer, and/or a jacketing layer of said cable.

This cable production comprises the steps of applying, preferably by (co)extrusion, one or more layers comprising a polymer composition on a conductor, wherein at least one layer comprises the crosslinked ethylene-based (co)polymer. If the cable has to contain two or more layers, each layer can be extruded in a separate step, or two or more of said layers can be co-extruded in the same extrusion step.

According to this embodiment, the functionalised ethylene based-(co)polymer, the organic peroxide, and any other optional components can be mixed in a mixer prior to introduction into the extruder. Alternatively, they can be added separately to the extruder and mixed therein. In the extruder, the mixture is subjected to elevated temperature, typically above the melting point of the polymer, and is (co)extruded on a conductor to form the cable layer(s).

After the formation of cable layer(s), the polymer is crosslinked at a temperature in the range 140-300° C., preferably 150-250° C., and most preferably 160-230° C. The pressure during the crosslinking step is preferably up to 20 bar, more preferably up to 13 bar, and most preferably 10-15 bar. The atmosphere is preferably inert, e.g. nitrogen or saturated steam. The crosslinked cable is then preferably cooled under pressurized conditions in a cooling medium such as $N_2$, oil or water.

EXAMPLES

Example 1

Modification of LDPE

LDPE (BPD2000 ex Ineos) was extruded together with 0, 1, or 2 phr citracon benzenesulfonylazide on a Thermo Scientific Haake PTW16, 40L/D lab extruder. The temperature in the extruder mixing zones ranged from 180 to 230° C., the screw speed was 150 rpm, the output was 1 kg/hr, and the residence time in the extruder was about 90 seconds. These settings were sufficient to fully decompose the azide, as confirmed by FT-IR spectrometry.

After extrusion, the grafted LDPE extrudates were chopped and liquid tert-butyl cumyl peroxide (Trigonox® T, ex-AkzoNobel) was added at different dosage levels to the chopped polymer beads at 60° C. to allow fast and homogeneous incorporation of the peroxide into the polymer particles. After absorption of the peroxide on the LDPE, the cure speed and crosslink density were evaluated at 180° C. using rheometry (Alfa technologies rheometer MDR 2000).

In a separate experiment, the gel percentage of the crosslinked LDPE was measured by immersion of a specific amount of crosslinked LDPE in refluxing xylenes (approximately 140° C.) to determine the insolubles (=gel) content. This is an industrial method to determine the ultimate state of cure.

The results are indicated in the table below. Recorded are the indication for cure speed: t5, t50 and t90, these are the times needed to reach 5, 50 or 90% of the ultimate maximal crosslink density. The delta torque ($\Delta S$) as measured in the rheometer is used as an indication of the crosslink density of the crosslinked LDPE.

TABLE 1

|  | Comp | 1 | 2 | Comp | 3 | 4 | Comp. | 5 | 6 | Comp | 7 | 8 |
| --- | --- | --- | --- | --- | --- | --- | --- | --- | --- | --- | --- | --- |
| azide (phr) | 0 | 1 | 2 | 0 | 1 | 2 | 0 | 1 | 2 | 0 | 1 | 2 |
| Perox. (phr) | 0.5 | 0.5 | 0.5 | 1 | 1 | 1 | 1.6 | 1.6 | 1.6 | 2 | 2 | 2 |
| t5 (min) | 0.9 | 0.5 | 0.5 | 0.8 | 0.5 | 0.5 | 0.5 | 0.5 | 0.5 | 0.8 | 0.5 | 0.4 |
| t50 (min) | 3.3 | 1.8 | 1.7 | 3.0 | 1.3 | 1.3 | 2.9 | 2.1 | 1.5 | 2.9 | 2.1 | 1.6 |
| t90 (min) | 10.2 | 7.3 | 7.5 | 8.8 | 6.1 | 6.0 | 8.6 | 7.2 | 6.1 | 8.5 | 7.0 | 6.1 |
| $\Delta S$ (Nm) | 0.15 | 0.26 | 0.24 | 0.26 | 0.53 | 0.54 | 0.44 | 0.62 | 0.74 | 0.57 | 0.68 | 0.84 |
| gel % | 69 | 81 | 81 | 80 | 90 | 91 | 89 | 92 | 93 | 91 | 94 | 96 |

It can be observed from the experiments that the grafting of the azide has two advantages: enhancement of the cure speed (shortening of t90) and enhancement of the level of cure (increase in ΔS and gel %). The effect of the citraconazide content depends on the level of peroxide dosage. At low peroxide dosage levels, an increase in citraconazide level from 1 to 2 phr is not leading to a further enhancement of the properties. When increasing the peroxide level, the effect of the increase in citraconazide on the crosslink density becomes more apparent. This shows that the amount of citraconazide and the amount of peroxide can be fine-tuned to allow control over cure speed and crosslink density.

Example 2

Modification of EPM

An ethylene-propylene copolymer (EPM), without unsaturations, was modified with the citraconazide used in Example 1. To achieve this, an EPM-based compound containing carbon black fillers and oil (see Table 2 for the composition) was mixed with 2 parts per hundred rubber (phr) of the citracon benzenesulfonylazide and heat treated at 150-180° C. in a Banbury type internal mixer to allow grafting of the azide onto the EPM.

After modification of the EPM compound with the azide, 3 phr of Perkadox® 14-40B-pd ex-AkzoNobel (=40 wt % di(tert-butylperoxyisopropyl)benzene on calcium carbonate), corresponding to 0.4 wt % pure peroxide, was mixed with the EPM using a two-roll-mill.

The EPM was cured by heating at 170° C.

The cure speed and crosslink density were evaluated using rheometry (Alfa technologies rheometer MDR 2000). The results are indicated in Table 2.

As a comparative experiment, an unmodified EPM was mixed with peroxide and crosslinked in the same manner.

TABLE 2

|  | Inv. Exp. | Comparative exp. |
| --- | --- | --- |
| EPM (Dutral ® CO 038) | 100 | 100 |
| Carbon black N771 | 70 | 70 |
| Carbon black N550 | 70 | 70 |
| Sunpar 550 oil | 50 | 50 |
| Citraconazide (phr) | 2 | — |
| Perkadox ® 14-40B-pd (phr) | 3 | 3 |
| Rheometer results: | | |
| t5 (min) | 0.4 | 0.5 |
| t50 (min) | 1.5 | 3.1 |
| t90 (min) | 6.2 | 11.1 |
| $M_L$ (min) | 0.3 | 0.3 |
| $M_H$ (min) | 1.9 | 1.0 |
| ΔS (Nm) | 1.6 | 0.7 |

The delta torque (ΔS) as measured in the rheometer is an indication of the crosslink density of the crosslinked EPM. It can be observed that the grafting of the azide has two advantages: to enhance the speed of cure (shorter t90) and to enhance the level of cure (increase in ΔS).

The invention claimed is:

1. Process for functionalising an ethylene-based (co)polymer comprising the step of contacting an ethylene-based (co)polymer at a temperature in the range 100-250° C. with an azide of formula (I)

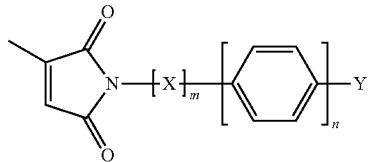

wherein Y is either

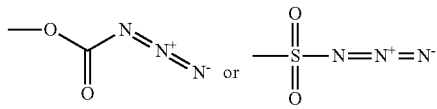

m is 0 or 1, n is 0 or 1, n+m=1 or 2, and X is a linear or branched, aliphatic or aromatic hydrocarbon moiety with 1-12 carbon atoms, optionally containing heteroatoms.

2. Process according to claim 1 wherein the ethylene based (co)polymer is LDPE.

3. Process according to claim 1 wherein the ethylene-based (co)polymer is EPM.

4. Process according to claim 1 wherein the azide is selected from 4-(3-methyl-2,5-dioxo-2,5-dihydro-1H-pyrrol-1-yl)benzene sulfonyl azide (also called citraconimide benzenesulfonylazide) and 2-(3-methyl-2,5-dioxo-2,5-dihydro-1H-pyrrol-1-yl)ethyl carbonazidate (also called citraconimide-C2-azidoformate).

5. Process according to claim 1 wherein the ethylene-based (co)polymer and the azide are contacted at a temperature in the range 140-230° C.

6. Process according to claim 1 wherein the azide is mixed with the ethylene-based (co)polymer in an amount of 0.1-5 phr.

7. Process for modifying an ethylene-based (co)polymer—comprising the steps of:
    preparing a functionalised ethylene-based (co)polymer according to the process of claim 1
    contacting the functionalised ethylene-based (co)polymer with an organic peroxide to form a polymer/peroxide mixture, and
    heating said polymer/peroxide mixture at a temperature in the range 140-300° C.

8. Process according to claim 7 wherein the polymer/peroxide mixture is shaped prior to heating.

9. Process according to claim 7 wherein the polymer/peroxide mixture is shaped by extrusion.

10. Process according to claim 7 wherein the organic peroxide is a dialkyl peroxide or a trioxepane.

11. Process according to claim 7 wherein the organic peroxide is selected from the group consisting of 3,3,5,7,7-pentamethyl-1,2,4trioxepane, 2,5-dimethyl-2,5-di(tertbutylperoxy)hexyne-3, 2,5-dimethyl-2,5-di(tertbutylperoxy)hexane, di(tert-butylperoxyisopropyl)benzene, dicumyl peroxide, and tert-butyl cumyl peroxide.

12. Functionalised ethylene-based (co)polymer obtainable by the process according to claim 1.

13. Modified ethylene-based (co)polymer obtainable by the process according to claim 7.

14. A process for making power cables comprising an electrical connector surrounded by one or more layers of the functionalised ethylene-based (co)polymer of claim 1.

15. A power cable comprising one or more layers of the modified ethylene-based (co)polymer of claim 1.

* * * * *